United States Patent
Zhang et al.

(10) Patent No.: US 11,649,673 B2
(45) Date of Patent: May 16, 2023

(54) CONSTANT FORCE MULTIPLE SPRING CURTAIN WINDING SYSTEM

(71) Applicant: Mingyang Windeco Technology Corporation, Henan (CN)

(72) Inventors: Nianqing Zhang, Henan (CN); Shehua Wei, Henan (CN)

(73) Assignee: Mingyang Windeco Technology Corporation, Henan (CN)

( * ) Notice: Subject to any disclaimer, the term of this patent is extended or adjusted under 35 U.S.C. 154(b) by 110 days.

(21) Appl. No.: 17/306,514

(22) Filed: May 3, 2021

(65) Prior Publication Data

US 2022/0205317 A1    Jun. 30, 2022

(30) Foreign Application Priority Data

Dec. 30, 2020 (CN) .......................... 202011597191.6
Dec. 30, 2020 (CN) .......................... 202023260546.0

(51) Int. Cl.
*E06B 9/60* (2006.01)
*E06B 9/42* (2006.01)
*F16H 1/28* (2006.01)

(52) U.S. Cl.
CPC ............... *E06B 9/60* (2013.01); *E06B 9/42* (2013.01); *F16H 1/28* (2013.01)

(58) Field of Classification Search
CPC ................. E06B 9/60; E06B 9/42; F16H 1/28
See application file for complete search history.

(56) References Cited

U.S. PATENT DOCUMENTS

| 9,816,317 | B2 * | 11/2017 | Chen | E06B 9/42 |
| 11,261,659 | B2 * | 3/2022 | Jang | E06B 9/60 |
| 2019/0100960 | A1 * | 4/2019 | Chen | E06B 9/34 |
| 2021/0262286 | A1 * | 8/2021 | Campagna | E06B 9/60 |

* cited by examiner

Primary Examiner — Beth A Stephan
(74) Attorney, Agent, or Firm — Hamre, Schumann, Mueller & Larson, P.C.

(57) ABSTRACT

The present invention provides a constant force multiple spring curtain winding system, including a mounting bracket fixedly connected to a wall, and a revolving drum connected to a curtain, wherein one end of the mounting bracket is connected to a rotating rod through a speed change mechanism, a constant force spring mechanism fixedly connected to the revolving drum is arranged on the rotating rod, and the rotating rod is fixedly connected to a constant force elastic piece in the constant force spring mechanism. According to the present invention, a speed of the revolving drum is adjusted by the speed change mechanism, and the rotating rod rotates at a low speed by the speed change mechanism when the revolving drum rotates at a high speed, thus ensuring that the revolving drum rotates for enough turns to meet a height of the curtain, maximizing a width of the curtain and reducing a counterweight of a lower rail of the curtain; and the requirement on the size of the curtain is met by increasing or decreasing the number of the constant force spring mechanisms, and the curtain is capable of staying at any positions. The constant force multiple spring curtain winding system is novel in structure, simple to operate, wide in application and easy to popularize.

8 Claims, 9 Drawing Sheets

CONSTANT FORCE MULTIPLE SPRING CURTAIN WINDING SYSTEM

FIELD OF TECHNOLOGY

The present invention relates to the technical field of a non-pulling curtain, and in particular, to a constant force multiple spring curtain winding system.

BACKGROUND

Most of the opening and closing systems of existing non-pulling curtains and rainbow curtains in the market use torsion spring rods or head type constant force springs which have many limitations on the opening and closing of the curtains. The more the spring rods are pulled down when the curtains are opened and closed, the greater the pull force is, and it is difficult to control the rebound of the curtains. The head type constant force springs are difficult to adapt to the height and size of the curtains.

SUMMARY

To solve the above problem, the present invention provides a constant force multiple spring curtain winding system.

The objective of the present invention is achieved in the following way:

A constant force multiple spring curtain winding system, comprising a mounting bracket fixedly connected to a wall, and a revolving drum connected to a curtain, wherein one end of the mounting bracket is connected to a rotating rod through a speed change mechanism, a constant force spring mechanism fixedly connected to the revolving drum is arranged on the rotating rod, and the rotating rod is fixedly connected to a constant force elastic piece in the constant force spring mechanism.

The speed change mechanism comprises a fixed gear, a speed change gear and a speed change cylinder, the fixed gear being fixedly connected to the mounting bracket, the speed change gear being fixedly connected to the rotating rod through a speed change bracket, the speed change cylinder being internally provided with an annular rotating gear rail, the speed change gear being disposed between the fixed gear and the rotating gear rail, the speed change gear being connected to the fixed gear and the rotating gear rail through gear engagement, and a first fixed groove used cooperatively with the revolving drum being arranged on an outer side of the speed change cylinder.

There are at least three speed change gears.

The constant force spring mechanism comprises a constant force spring box, the constant force spring box being internally provided with a spring rotary core, an outer side of the spring rotary core being fixedly connected to the constant force elastic piece, an inner side of the spring rotary core being fixedly connected to the rotating rod, and a second fixed groove used cooperatively with the revolving drum being arranged on an outer side of the constant force spring box.

A fixed rib is arranged in the revolving drum along a length direction, the fixed rib being crosswise connected to the first fixed groove and the second fixed groove.

A cross section of the rotating rod is D-shaped.

The constant force elastic piece is a constant force spring.

As compared with the prior art, according to the present invention, a speed of the revolving drum is adjusted by the speed change mechanism, and the rotating rod rotates at a low speed by the speed change mechanism when the revolving drum rotates at a high speed, thus ensuring that the revolving drum rotates for enough turns to meet a height of the curtain, maximizing a width of the curtain and reducing a counterweight of a lower rail of the curtain; and the requirement on the size of the curtain is met by increasing or decreasing the number of the constant force spring mechanisms, and the curtain is capable of staying at any positions. The constant force multiple spring curtain winding system is novel in structure, simple to operate, wide in application and easy to popularize.

In the drawings, 1. Mounting bracket, 101. Fixed gear, 2. Speed change cylinder, 3. Speed change bracket, 4. Constant force spring box, 5. Rotating rod, 6. Speed change gear, 7. Rotating gear rail, 8. Second fixed groove, 9. Constant force elastic piece, 10. Spring rotary core, 11. First fixed groove.

DESCRIPTION OF THE EMBODIMENTS

As shown in FIG. 1 to FIG. 13, a constant force multiple spring curtain winding system includes a mounting bracket 1 fixedly connected to a wall, and a revolving drum connected to a curtain, wherein one end of the mounting bracket 1 is connected to a rotating rod 5 through a speed change mechanism, a constant force spring mechanism fixedly connected to the revolving drum is arranged on the rotating rod 5, the rotating rod 5 is fixedly connected to a constant force elastic piece 9 in the constant force spring mechanism, and a constant force spring box 4 of the constant force spring mechanism is in sleeving connection with the revolving drum and is fixedly connected to the revolving drum; meanwhile, a speed change cylinder 2 of the speed change mechanism is fixedly connected to the revolving drum, the revolving drum is driven by a curtain to rotate, the revolving drum drives the speed change cylinder 2 and the constant force spring box 4 to rotate rapidly and synchronously, such that the rotating rod 5 rotates slowly through the speed change mechanism. When the revolving drum and the constant force spring box 4 synchronously rotate for 3.5 turns, the rotating rod 5 rotates for one turn to meet the height of the curtain. The speed of the revolving drum is adjusted through the speed change mechanism, and the rotating rod 5 rotates at a low speed through the speed change mechanism when the revolving drum rotates at a high speed, thus ensuring that the revolving drum rotates for enough turns to meet a height of the curtain, maximizing a width of the curtain and reducing a counterweight of a lower rail of the curtain. The curtain can stay at any positions through increase or decrease of the number of the constant force spring mechanisms. The constant force multiple spring curtain winding system is novel in structure, simple to operate, wide in application and easy to popularize.

Figure 1:
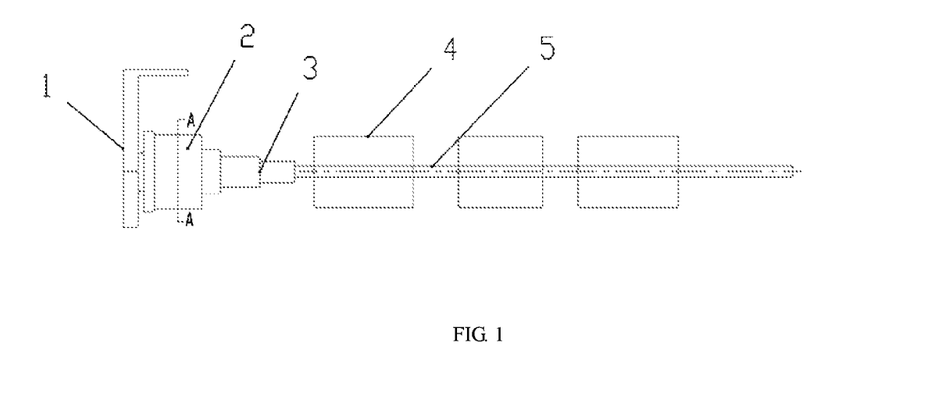
FIG. 1 is a structural schematic diagram according to the present invention.
Figure 2:
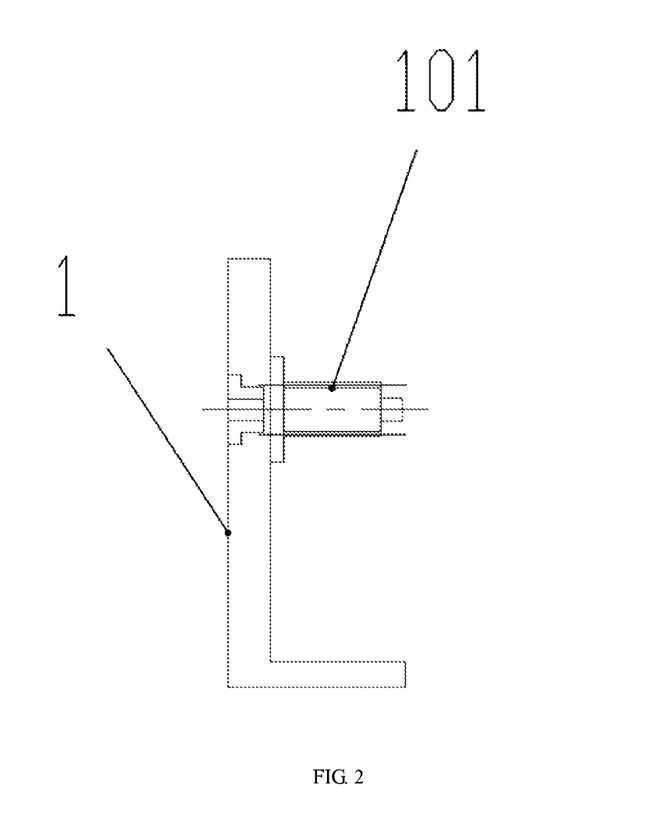
FIG. 2 is a structural schematic diagram of a mounting bracket.
Figure 3:
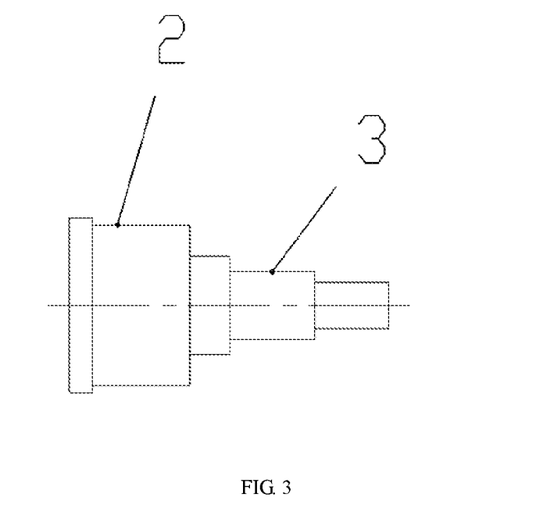
FIG. 3 is a mounting schematic diagram of a speed change cylinder and a speed change bracket.
Figure 4:
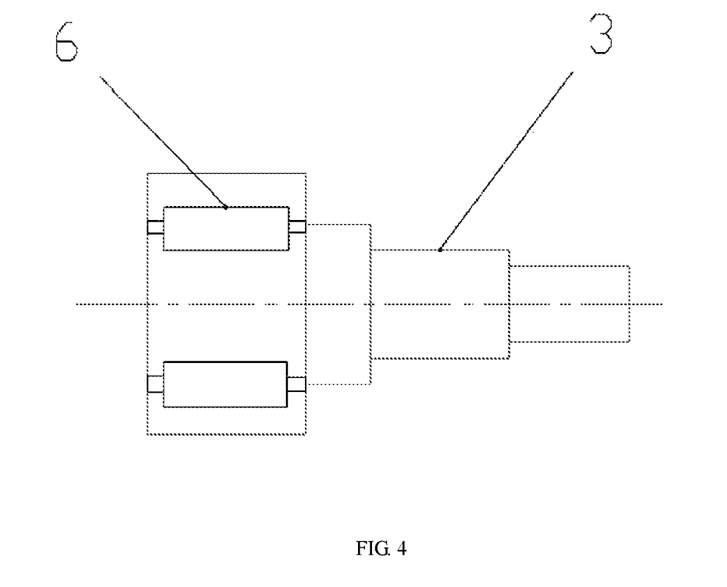
FIG. 4 is a structural schematic diagram of a speed change bracket.
Figure 5:
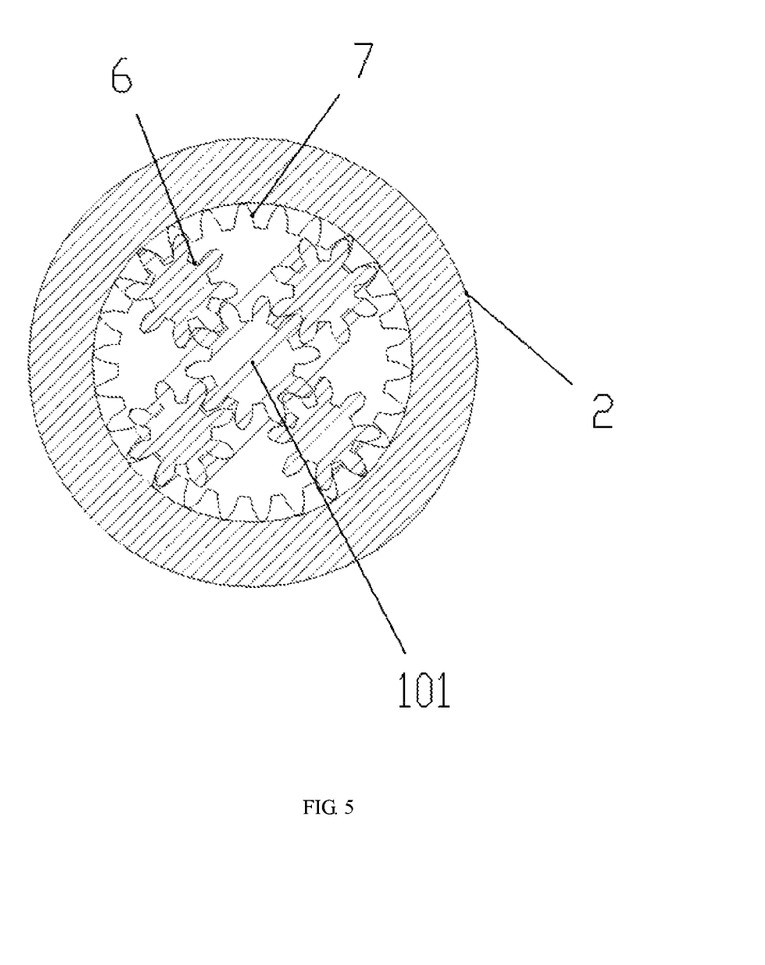
FIG. 5 is a schematic diagram of a direction A in FIG. 1.
Figure 6:
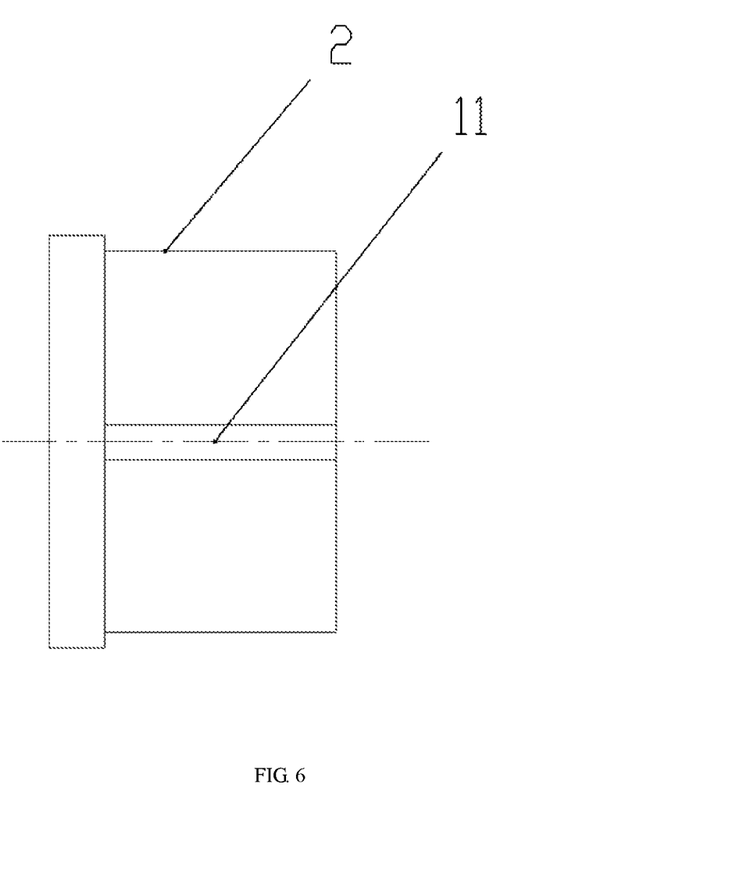
FIG. 6 is a structural schematic diagram of a speed change cylinder.
Figure 7:
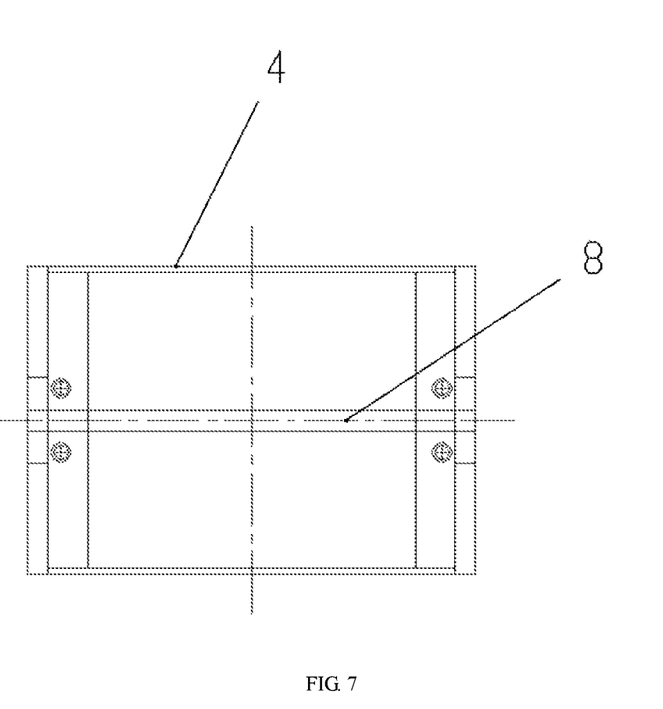
FIG. 7 is a structural schematic diagram of a constant force spring box.
Figure 8:
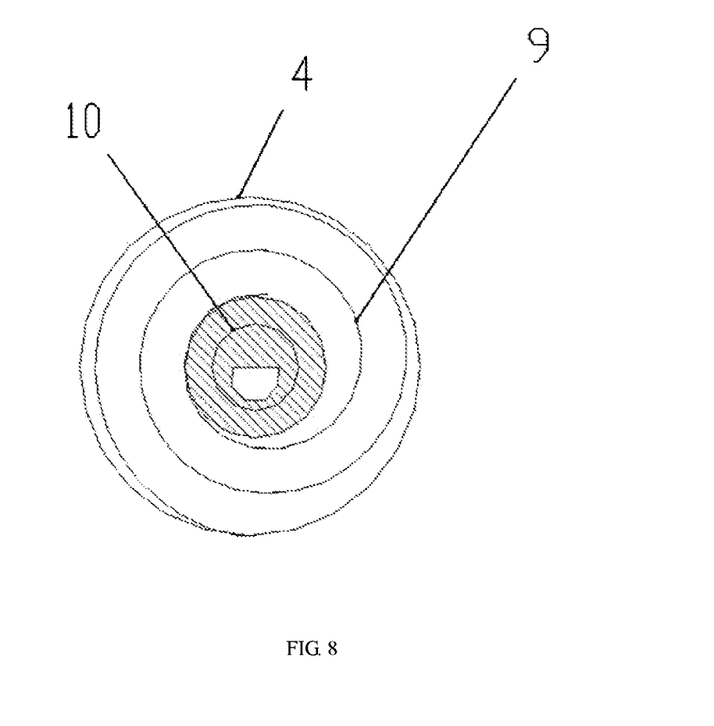
FIG. 8 is a schematic diagram of an internal structure of a constant force spring box.
Figure 9:
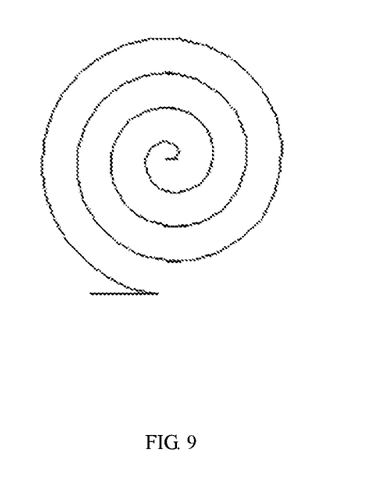
FIG. 9 is a structural schematic diagram of a constant force elastic piece.
Figure 10:
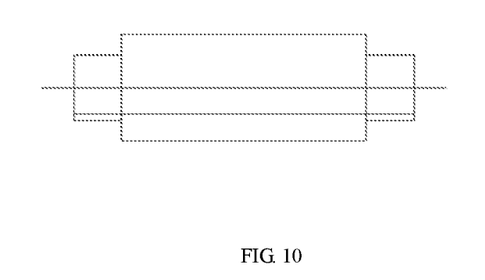
FIG. 10 is a structural schematic diagram of a spring rotary core.
Figure 11:
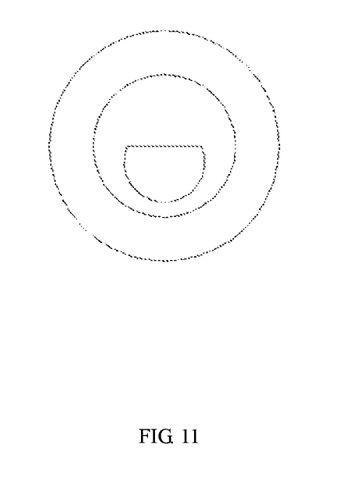
FIG. 11 is a side view of a spring rotary core.
Figure 12:
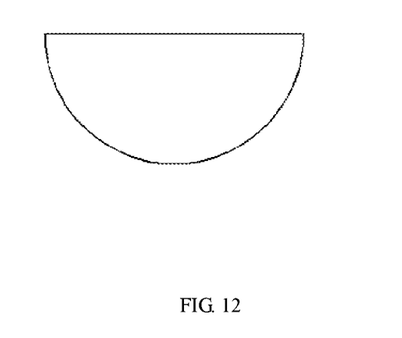
FIG. 12 is a side view of a rotating rod.
Figure 13:
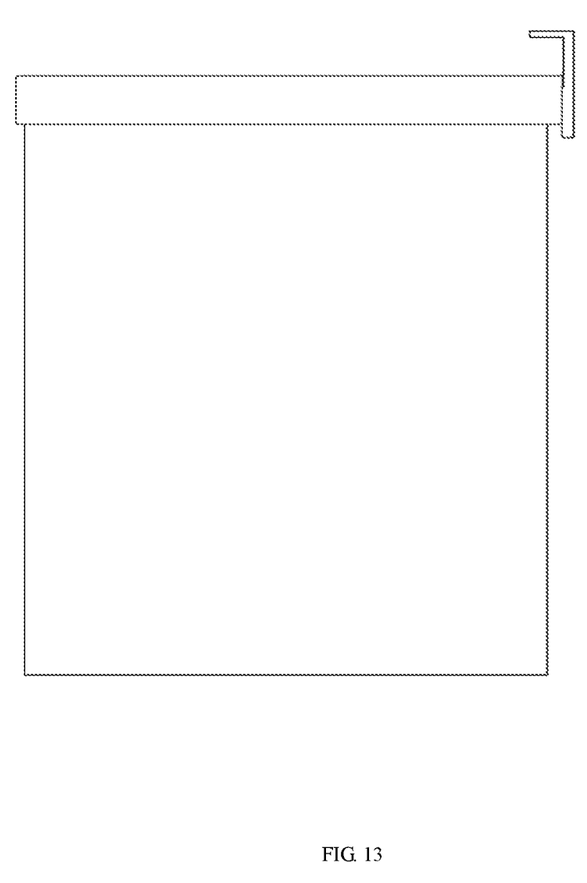
FIG. 13 is a mounting schematic diagram of the present invention and a curtain.

The speed change mechanism includes a fixed gear 101, a speed change gear 6 and the speed change cylinder 2, wherein the fixed gear 101 is fixedly connected to the mounting bracket 1, the speed change gear 6 is fixedly connected to the rotating rod 5 through a speed change bracket 3, the speed change cylinder 2 is internally provided with an annular rotating gear rail 7, the speed change gear 6 is disposed between the fixed gear 101 and the rotating gear rail 7, the speed change gear 6 is connected to the fixed gear 101 and the rotating gear rail 7 through gear engagement, and a first fixed groove 11 used cooperatively with the revolving drum is arranged on an outer side of the speed change cylinder 2. In the speed change mechanism, the speed change cylinder 2, the fixed gear 101 and the speed change gear 6 are included, wherein the fixed gear 101 is fixed on the mounting bracket 1, the speed change gear 6 is arranged on the speed change bracket 3, two ends of the speed change gear 6 are hinged to the speed change bracket 3, one end of the speed change bracket 3 is fixedly connected to the rotating rod 5, the speed change gear 6 is mounted behind the speed change bracket 3 and is in sleeving connection with the speed change cylinder 2, an outer side of the speed change gear 6 is engaged with the rotating gear rail 7, the fixed gear 101 is inserted and connected into the speed change bracket 3, the fixed gear 101 is engaged with an interior of the speed change gear 6, the speed change cylinder 2 is fixedly connected to the revolving drum, the revolving drum drives the speed change cylinder 2 to rotate, the speed change cylinder 2 drives the speed change bracket 3 through the rotating gear rail 7 to rotate, and the speed change bracket 3 drives the rotating rod 5 to rotate. It should be noted that there are at least three speed change gears 6, as shown in FIG. 5, there are preferably four speed change gears 6. The speed change gears 6 and the fixed gear 101 are arranged as planetary gears. When the speed change cylinder 2 rotates rapidly, the rotating rod 5 rotates slowly. The specific process is as follows: when the curtain is manually pulled down, the curtain drives the revolving drum to rotate at a high speed and the revolving drum is fixedly connected to the speed change cylinder 2. When the revolving drum rotates at the high speed, the speed change cylinder 2 is driven to rotate at a high speed, the speed change cylinder 2 drives the speed change gears 6 through the rotating gear rail 7 to rotate, and the speed change gears 6 cooperate with the fixed gear 101 to drive the speed change bracket 3 to rotate slowly. The specific process is as follows: when the revolving drum drives for 35 turns, the revolving drum drives the speed change cylinder 2 to rotate for 35 turns, the speed change cylinder 2 drives the speed change bracket 3 through the speed change gears 6 and the fixed gear 101, the speed change bracket 3 drives the rotating rod 5 to rotate, the rotating rod 5 only rotates for 10 turns, and the rotating speed ratio is 3.5:1, thus ensuring that the revolving drum rotates for enough turns to meet the height of the curtain.

The constant force spring mechanism includes the constant force spring box 4, wherein the constant force spring box 4 is internally provided with a spring rotary core 10, an outer side of the spring rotary core 10 is fixedly connected to the constant force elastic piece 9, an inner side of the spring rotary core 10 is fixedly connected to the rotating rod 5, a second fixed groove 8 used cooperatively with the revolving cylinder is arranged on an outer side of the constant force spring box 4, the spring rotary core 10 is arranged in the constant force spring box 4, the spring rotary core 10 is fixedly connected to the constant force elastic piece 9, the constant force spring box 4 is fixedly connected to the revolving drum, the constant force spring box 4 is nested in the revolving drum, and the constant force spring box 4 and the speed change cylinder 2 rotate synchronously. When the constant force spring box 4 rotates at a high speed, the spring rotary core 10 is fixedly connected to the rotating rod 5, and the rotating rod 5 drives the spring rotary core 10 to rotate slowly, such that the constant force elastic piece 9 is driven by the spring rotary core 10 to deform. The specific fixation mode is that a fixed rib is arranged in the revolving drum along a length direction, the fixed rib is in inserting connection with the first fixed groove 11 and the second fixed groove 8, and the fixed rib connects the speed change cylinder 2 and the constant force spring box 4 into a whole through the first fixed groove 11 and the second fixed groove 8, thereby realizing synchronous rotation of the speed change cylinder 2 and the constant force spring box 4. It should be noted that the rotating rod 5 is not fixedly connected to the constant force spring box 4 and is fixedly connected to the spring rotary core 10, and the spring rotary core 10 is connected to the constant force spring box 4 through the constant force elastic piece 9.

A cross section of the rotating rod 5 is D-shaped.

The constant force elastic piece 9 is a constant force spring. The constant force spring is the prior art. The constant force spring consists of a spiral metal sheet and an inner side of the metal sheet is bended, such that each circle of metal sheet is tightly wound on one circle of metal sheet therein. When the metal sheet is stretched (twisted), an internal stress resists a load force, which is exactly the same as the ordinary extension spring, but the coefficient is close to a constant value (zero). During use, the spring is tightly wound on a roller generally by ID, a free end of the spring is connected to the load just like a balance weight, but vice verse, the free end is fixed and the spring provides a working force by itself, just like a carbon brush in an electrical device.

The working process of the present invention is as follows: the constant force spring mechanism fixedly connected to the revolving drum is arranged on the rotating rod 5, the rotating rod 5 is fixedly connected to the constant force elastic piece 9 in the constant force spring mechanism, and the constant force spring box 4 of the constant force spring mechanism is in sleeving connection with the revolving drum and is fixedly connected to the revolving drum; meanwhile, the speed change cylinder 2 of the speed change mechanism is fixedly connected to the revolving drum, the revolving drum is driven by the curtain to rotate, the revolving drum drives the speed change cylinder 2 and the constant force spring box 4 to rotate rapidly and synchronously, such that the rotating rod 5 rotates slowly through the speed change mechanism. When the revolving drum and the constant force spring box 4 synchronously rotate for 3.5 turns, the rotating rod 5 rotates for one turn to meet the height of the curtain. The speed of the revolving drum is adjusted through the speed change mechanism, and the rotating rod 5 rotates at a low speed through the speed change mechanism when the revolving drum rotates at a high speed, thus ensuring that the revolving drum rotates for enough turns to meet a height of the curtain, maximizing a width of the curtain and reducing a counterweight of a lower rail of the curtain. The curtain can stay at any positions through increase or decrease of the number of the constant force spring mechanisms. The constant force multiple spring curtain winding system is novel in structure, simple to operate, wide in application and easy to popularize. The speed change mechanism includes the fixed gear 101, the speed change gear 6 and the speed change cylinder 2, wherein the fixed gear 101 is fixedly connected to the mounting bracket 1, the speed change gear 6 is fixedly connected to the rotating rod 5 through a speed change bracket 3, the speed change cylinder 2 is internally provided with an annular rotating gear rail 7, the speed change gear 6 is disposed between the fixed gear 101 and the rotating gear rail 7, the speed gear 6 is connected to the fixed gear 101 and the rotating gear rail 7 through gear engagement, and a first fixed groove 11 used cooperatively with the revolving drum is arranged on an outer side of the speed change cylinder 2. In the speed change mechanism, the speed change cylinder 2, the fixed gear 101 and the speed change gear 6 are included, wherein the fixed gear 101 is fixed on the mounting bracket 1, the speed change gear 6 is arranged on the speed change bracket 3, two ends of the speed change gear 6 are hinged to the speed change bracket 3, one end of the speed change bracket 3 is fixedly connected to the rotating rod 5, the speed change gear 6 is mounted behind the speed change bracket 3 and is in sleeving connection with the speed change cylinder 2, an outer side of the speed change gear 6 is engaged with the rotating gear rail 7, the fixed gear 101 is inserted and connected into the speed change bracket 3, the fixed gear 101 is engaged with an interior of the speed change gear 6, the speed change cylinder 2 is fixedly connected to the revolving drum, the revolving drum drives the speed change cylinder 2 to rotate, the speed change cylinder 2 drives the speed change bracket 3 through the rotating gear rail 7 to rotate, and the speed change bracket 3 drives the rotating rod 5 to rotate. It should be noted that there are at least three speed change gears 6, as shown in FIG. 5, there are preferably four speed change gears 6. The speed change gears 6 and the fixed gear 101 are arranged as planetary gears. When the speed change cylinder 2 rotates rapidly, the rotating rod 5 rotates slowly. When the curtain is manually pulled down, the curtain drives the revolving drum to rotate at a high speed and the revolving drum is fixedly connected to the speed change cylinder 2. When the revolving drum rotates at the high speed, the speed change cylinder 2 is driven to rotate at a high speed, the speed change cylinder 2 drives the speed change gears 6 through the rotating gear rail 7 to rotate, and the speed change gears 6 cooperate with the fixed gear 101 to drive the speed change bracket 3 to rotate slowly. The specific process is as follows: when the revolving drum drives for 35 turns, the revolving drum drives the speed change cylinder 2 to rotate for 35 turns, the speed change cylinder 2 drives the speed change bracket 3 through the speed change gears 6 and the fixed gear 101, the speed change bracket 3 drives the rotating rod 5 to rotate, the rotating rod 5 only rotates for 10 turns, and the rotating speed ratio is 3.5:1, thus ensuring that the revolving drum rotates for enough turns to meet the height of the curtain.

The constant force spring mechanism includes the constant force spring box 4, wherein the constant force spring box 4 is internally provided with a spring rotary core 10, an outer side of the spring rotary core 10 is fixedly connected to the constant force elastic piece 9, an inner side of the spring rotary core 10 is fixedly connected to the rotating rod 5, a second fixed groove 8 used cooperatively with the revolving cylinder is arranged on an outer side of the constant force spring box 4, the spring rotary core 10 is arranged in the constant force spring box 4, the spring rotary core 10 is fixedly connected to the constant force elastic piece 9, the constant force spring box 4 is fixedly connected to the revolving drum, the constant force spring box 4 is nested in the revolving drum, and the constant force spring box 4 and the speed change cylinder 2 rotate synchronously. When the constant force spring box 4 rotates at a high speed, the spring rotary core 10 is fixedly connected to the rotating rod 5, and the rotating rod 5 drives the spring rotary core 10 to rotate slowly, such that the constant force elastic piece 9 is driven by the spring rotary core 10 to deform. The specific fixation mode is that a fixed rib is arranged in the revolving drum along a length direction, the fixed rib is in inserting connection with the first fixed groove 11 and the second fixed groove 8, and the fixed rib connects the speed change cylinder 2 and the constant force spring box 4 into a whole through the first fixed groove 11 and the second fixed groove 8, thereby realizing synchronous rotation of the speed change cylinder 2 and the constant force spring box 4. It should be noted that the rotating rod 5 is not fixedly connected to the constant force spring box 4 and is fixedly connected to the spring rotary core 10, and the spring rotary core 10 is connected to the constant force spring box 4 through the constant force elastic piece 9. The specific process is as follows: when the curtain is manually pulled down, the curtain drives the revolving drum to rotate at a high speed, the revolving drum is fixedly connected to the speed change cylinder 2, the revolving drum is fixedly connected to the speed change cylinder 2 and the constant force spring box 4 through the fixed rib; and when the revolving drum rotates at a high speed, the speed change cylinder 2 and the constant force spring box 4 are driven to rotate at a high speed, the speed change cylinder 2 drives the speed change gears 6 to rotate through the rotating gear rail 7, the speed gears 6 cooperate with the fixed gear 101 to drive the speed change bracket 3 to rotate slowly. The specific process is as follows: when the revolving cylinder rotates for 35 turns, the revolving drum drives the speed change cylinder 2 and the constant force spring box 4 to rotate for 35 turns, the speed change cylinder 2 drives the speed change bracket 3 through the speed change gears 6 and the fixed gear 101, the speed change bracket 3 drives the rotating rod 5 to rotate, the rotating rod 5 rotates only for 10 turns, the rotating rod 5 drives the spring rotary core 10 to rotate for 10 turns, such that the constant force spring rotates for 10 turns and the rotating speed ratio is 3.5:1, the revolving drum is ensured to rotate for enough turns to meet the height of the curtain, the elastic force of the constant force spring is equal to the self-weight of the curtain to form gravitational equilibrium, and the curtain is pulled to any positions to stop. When the curtain is folded, the bottom of the curtain is supported by a hand, the balance between the curtain and the constant force spring is damaged, and the elastic force of the constant force spring drives the revolving drum to rotate and drive the curtain to fold.

According to the present invention, a speed of the revolving drum is adjusted by the speed change mechanism, and the rotating rod 5 rotates at a low speed by the speed change mechanism when the revolving drum rotates at a high speed, thus ensuring that the revolving drum rotates for enough turns to meet a height of the curtain, maximizing a width of the curtain and reducing a counterweight of a lower rail of the curtain. The curtain can stay at any positions through increase or decrease of the number of the constant force spring mechanisms. The constant force multiple spring curtain winding system is novel in structure, simple to operate, wide in application and easy to popularize.

What is claimed is:

1. A constant force multiple spring curtain winding system, comprising a mounting bracket fixedly connected to a wall, a revolving drum connected to a curtain, a rotating rod, and a speed change mechanism, wherein one end of the mounting bracket is connected to the rotating rod through the speed change mechanism, a constant force spring mechanism fixedly connected to the revolving drum is arranged on the rotating rod, and the rotating rod is fixedly connected to a constant force elastic piece in the constant force spring mechanism, the constant force spring mechanism including a constant force spring box, the constant force spring box in sleeving connection with the revolving drum and fixedly connected to the revolving drum, the speed change mechanism includes a speed change cylinder fixedly connected to the revolving drum, wherein the revolving drum is configured to be driven by the curtain to rotate, and the revolving drum drives the speed change cylinder and the constant force spring box to rotate synchronously, such that the rotating rod rotates relatively slower than the revolving drum through the speed change mechanism.

2. The constant force multiple spring curtain winding system according to claim 1, wherein the speed change mechanism comprises a fixed gear, at least one speed change gear, and the speed change cylinder, the fixed gear being fixedly connected to the mounting bracket, the at least one speed change gear being fixedly connected to the rotating rod through a speed change bracket, the speed change cylinder being internally provided with an annular rotating gear rail, the at least one speed change gear being disposed between the fixed gear and the rotating gear rail, the at least one speed change gear being connected to the fixed gear and the rotating gear rail through gear engagement, and a first fixed groove used cooperatively with the revolving drum being arranged on an outer side of the speed change cylinder.

3. The constant force multiple spring curtain winding system according to claim 2, wherein the at least one speed change gear is at least three speed change gears.

4. The constant force multiple spring curtain winding system according to claim 2, wherein the constant force spring box is internally provided with a spring rotary core, an outer side of the spring rotary core being fixedly connected to the constant force elastic piece, an inner side of the spring rotary core being fixedly connected to the rotating rod, and a second fixed groove used cooperatively with the revolving drum being arranged on an outer side of the constant force spring box.

5. The constant force multiple spring curtain winding system according to claim 4, wherein a fixed rib is arranged in the revolving drum along a length direction, the fixed rib being crosswise connected to the first fixed groove and the second fixed groove.

6. The constant force multiple spring curtain winding system according to claim 4, wherein a cross section of the rotating rod is D-shaped.

7. The constant force multiple spring curtain winding system according to claim 6, wherein the constant force elastic piece is a constant force spring.

8. A constant force multiple spring curtain winding system, comprising a mounting bracket fixedly connected to a wall, a revolving drum connected to a curtain, a rotating rod, and a speed change mechanism, wherein one end of the mounting bracket is connected to the rotating rod through the speed change mechanism, a constant force spring mechanism fixedly connected to the revolving drum is arranged on the rotating rod, and the rotating rod is fixedly connected to a constant force elastic piece in the constant force spring mechanism, wherein the speed change mechanism comprises a fixed gear, a speed change gear and a speed change cylinder, the fixed gear being fixedly connected to the mounting bracket, the speed change gear being fixedly connected to the rotating rod through a speed change bracket, the speed change cylinder being internally provided with an annular rotating gear rail, the speed change gear being disposed between the fixed gear and the rotating gear rail, the speed change gear being connected to the fixed gear and the rotating gear rail through gear engagement, and a first fixed groove used cooperatively with the revolving drum being arranged on an outer side of the speed change cylinder.

* * * * *